United States Patent
Mancinelli et al.

(10) Patent No.: US 12,098,971 B2
(45) Date of Patent: Sep. 24, 2024

(54) SYSTEM FOR MEASURING THE SLIP OF A TYRE WITH RESPECT TO A RIM, ON WHICH SAID TYRE IS MOUNTED, AND METHOD THEREOF

(71) Applicant: TRELLEBORG WHEEL SYSTEMS ITALIA S.P.A., Tivoli (IT)

(72) Inventors: Piero Mancinelli, Pescara (IT); Andrea Evangelisti, Tivoli (IT); Enrico Pieralice, Tivoli (IT)

(73) Assignee: TRELLEBORG WHEEL SYSTEMS ITALIA S.P.A., Tivoli (IT)

( * ) Notice: Subject to any disclaimer, the term of this patent is extended or adjusted under 35 U.S.C. 154(b) by 415 days.

(21) Appl. No.: 17/764,899

(22) PCT Filed: Sep. 29, 2020

(86) PCT No.: PCT/IT2020/050238
§ 371 (c)(1),
(2) Date: Mar. 29, 2022

(87) PCT Pub. No.: WO2021/064760
PCT Pub. Date: Apr. 8, 2021

(65) Prior Publication Data
US 2022/0357239 A1  Nov. 10, 2022

(30) Foreign Application Priority Data

Sep. 30, 2019  (IT) .................. 102019000017498

(51) Int. Cl.
*G01M 17/02*  (2006.01)
*B60C 19/00*  (2006.01)
(Continued)

(52) U.S. Cl.
CPC ............ *G01M 17/02* (2013.01); *B60C 19/00* (2013.01); *G01P 3/44* (2013.01); *G01P 15/14* (2013.01); *B60C 2019/004* (2013.01)

(58) Field of Classification Search
CPC .. G01M 17/02; B60C 19/00; B60C 2019/004; G01P 3/44; G01P 15/14
See application file for complete search history.

(56) References Cited

U.S. PATENT DOCUMENTS 9,610,810 B1 *  4/2017  Singh ............... B60C 23/0488
10,247,816 B1 *  4/2019  Hoffmann ........... G01S 13/931
(Continued)

FOREIGN PATENT DOCUMENTS

CA     2209645 A  *  1/1998  .............. G01P 3/481
CN   105891107 A  *  8/2016  .............. G01N 19/02
(Continued)

OTHER PUBLICATIONS

International Search Report and Written Opinion issued in related International Patent Application No. PCT/IT2020/050238, issued on on Nov. 12, 2020 (9 pages, in English).

(Continued)

*Primary Examiner* — Natalie Huls
*Assistant Examiner* — Nyla Gavia
(74) *Attorney, Agent, or Firm* — Bookoff McAndrews, PLLC

(57) ABSTRACT

The present invention relates to the system for measuring the slip of a tyre (10) with respect to a rim (20), on which said tyre (10) is mounted.
In particular, said system comprises a first electronic device (1) and a second electronic device (2), each of which is configured at least to acquire, filter, store and send data, and a processing unit (3), external to said electronic devices (1, 2), configured at least to receive and process the data sent by (Continued)

each electronic device (1, 2), in order to measure said slip by measuring an angle ($\alpha$) and comparing the value of this angle with respect to at a reference angle $\alpha_{ref}$.

The present invention also relates to method for measuring the slip of a tyre (10) with respect to a rim (20), on which said tyre (10) is mounted.

20 Claims, 5 Drawing Sheets

(51) Int. Cl.
*G01P 3/44* (2006.01)
*G01P 15/14* (2013.01)

(56) References Cited

U.S. PATENT DOCUMENTS

| | | | |
|---|---|---|---|
| 10,948,582 B1* | 3/2021 | Hoffmann | G01S 13/86 |
| 11,415,432 B2* | 8/2022 | De-Thomasis | G01P 15/14 |
| 2010/0089139 A1* | 4/2010 | Ivory | G01M 17/02 |
| | | | 73/146 |
| 2016/0161373 A1* | 6/2016 | Singh | B60C 23/04 |
| | | | 73/146 |
| 2016/0318356 A1* | 11/2016 | McMillen | B60T 8/1725 |
| 2017/0102293 A1* | 4/2017 | Singh | G01G 19/086 |
| 2018/0088005 A1* | 3/2018 | Provana | B60C 99/00 |
| 2019/0270347 A1* | 9/2019 | Stewart | G01M 17/02 |

FOREIGN PATENT DOCUMENTS

| | | | | |
|---|---|---|---|---|
| DE | 202019102183 U1 * | 7/2019 | | B60C 23/002 |
| FR | 3042281 A1 | 4/2017 | | |
| JP | 2005193711 A | 7/2005 | | |
| JP | 2007278801 A | 10/2007 | | |
| JP | 2012073048 A | 4/2012 | | |
| JP | 2018004418 A | 1/2018 | | |
| JP | 2018176817 A * | 11/2018 | | |
| WO | WO-2009070063 A1 * | 6/2009 | | B60C 23/0462 |
| WO | WO-2015049418 A1 * | 4/2015 | | B60Q 1/38 |
| WO | 2016151544 A1 | 9/2016 | | |

OTHER PUBLICATIONS

Office Action issued in Japanese Patent Application No. 2022-520056, issued on Mar. 5, 2024 (8 pages with English translation).

* cited by examiner

SYSTEM FOR MEASURING THE SLIP OF A TYRE WITH RESPECT TO A RIM, ON WHICH SAID TYRE IS MOUNTED, AND METHOD THEREOF

FIELD OF THE INVENTION

The present invention relates to a system for measuring the slip of a tyre with respect to a rim on which said tyre is mounted.

In particular, the system comprises a first electronic device, applied in use on the inner surface of the tyre, a second electronic device, applied in use on the rim, for example on the rim channel, as well as a processing unit (external to said electronic devices), wherein said system is configured to measure the slip over time of a tyre with respect to the rim, when the tyre is in use, on the basis of a variation of an angle, arranged between a first axis (passing through the centre of the tyre and the point of application of the first electronic device on the tyre) and a second axis (passing through the centre of the tyre and the point of application of the second electronic device on the rim), with respect to a reference angle.

Consequently, the measure of the slip is a dynamic measure.

Each electronic device is configured at least to acquire data, filter and store said data, as well as send them to said processing unit, and said processing unit is configured at least to acquire the data sent by said electronic devices and process said data to measure the slip between tyre and rim.

The expression "slip" refers to the variation of an angle arranged between a first axis, passing through the centre of the tyre and a first point coinciding with the point of the internal surface of the tyre where the first electronic device is applied, and a second axis, passing through the centre of the tyre and a second point coinciding with the point of the rim where the second electronic device is applied, with respect to a reference angle.

The present invention also relates to a method for measuring the slip of the tyre with respect to the rim on which said tyre is mounted.

BACKGROUND OF THE INVENTION

As is known, in the motor vehicle sector, in particular in the agricultural vehicle sector, the slip of one or more tyres with respect to the respective rims (on which each tyre is mounted), can cause significant damage to the tyres and compromise the integrity of said tyres during use.

Therefore, the slip of a tyre with respect to a rim is a risk for the safety of users.

In the agricultural vehicle sector, the slip of a tyre with respect to the rim can be tolerated within certain limits, without this slip causes irreversible damages to the tyre and/or rim.

Consequently, it is necessary to monitor the slip of a tyre with respect to a rim to avoid that damages to the tyre are such that the tyre needs to be replaced.

Currently, a device for monitoring the operation of a tyre comprising a slip detection device is known.

Said detection device comprises:
an illuminator,
a colorimetric sensor, and
an annular surface consisting of a multiplicity of sectors, in which consecutive sectors have different colours and each sector has a length that subtends a predetermined angle equal to a predetermined slip angular resolution.

The colorimetric sensor is arranged inside a cavity and is able to detect the colour of a light emitted by said illuminator and reflected by one of the sectors of the annular surface.

The colorimetric sensor and the illuminator can be integral with the rim and the annular surface can be integral with the tyre or vice versa.

In any case, if there is a slip of the tyre with respect to the rim, the colorimetric sensor will detect the colour of the light reflected by a sector, measuring the extent of the slip.

However, said measuring device has some disadvantages.

A first disadvantage of said detection device is due to the fact that the detection of said colorimetric sensor can be affected by any residues of dirt, dust or the presence of water that can enter said cavity.

A second disadvantage, connected with the presence of residues of dirt, dust or drops of water, is due to the fact that the characteristics of the coloured sectors can be affected.

A further disadvantage is due to the need to provide an illuminator for illuminating the inner surface of the tyre and supplying power means for supplying power to said illuminator, so that the structure of said detection device is a complex structure.

Other systems for measuring the slip of a tyre with respect to a rim on which said tyre is mounted are disclosed, for example, in documents WO 2016/151544 A1, JP 2007-278801 A and FR 3042281 A1.

SUMMARY OF THE INVENTION

The aim of the present invention is to overcome said disadvantages, providing a system and a method for measuring the slip over time of a tyre with respect to a rim on which said tyre is mounted, when the tyre is in use, so as to avoid premature wear of the tyre, in particular in correspondence with the tyre bead (i.e., the contact area between rim and tyre).

In fact, a slip of the tyre with respect to the rim throughout the course of time causes wear of the tyre bead, and this causes damage to the tyre.

It is therefore object of the invention a system for measuring the slip between a tyre and a rim on which said tyre is mounted, wherein said system comprises:
  a first electronic device to be positioned, in use, in contact with the inner surface of the tyre,
  a second electronic device, to be positioned, in use, in contact with said rim,
  a processing unit, external to said electronic devices,
wherein:
  a first reference system $x_1$, $y_1$, $z_1$ is associated with the first electronic device in such a way that the axis $x_1$ is tangent to the rotation of a first point which is a point of said tyre in which said first electronic device is applied, e the axis $z_1$ is perpendicular to said axis $x_1$,
  a second reference system $x_2$, $y_2$, $z_2$ is associated to the second electronic device in such a way that the axis $x_2$ is tangent to the rotation of a second point which is a point of said rim in which said second electronic device is applied, and the axis $z_2$ is perpendicular to said axis $x_2$.

The first electronic device is configured at least for sending data to said processing unit and comprises inside:
  a first inertial measurement unit comprising a first gyroscope and a first accelerometer and configured to:
    acquire, through said first gyroscope, the value of at least one angular velocity around the y axis, and, through said first accelerometer, the value of at least one linear acceleration along the x axis, first storage means for storing data,
a first logic control unit, connected with said first inertial measurement and to said first storage means, and configured to:
receive from the first inertial measurement unit the value of said at least one angular velocity around the y axis and the value of said at least one linear acceleration along the x axis,
filter by means of a first digital filter the value of said at least one angular velocity around the y axis to obtain at least one filtered angular velocity around the y axis and the value of said at least one linear acceleration along the x axis to obtain at least one filtered angular acceleration along the x axis,
identify each time instant in which the value of said filtered linear acceleration along the x axis is equal to a predetermined value,
store in said first storage means:
each time instant in which the value of said filtered linear acceleration along the x axis is equal to said predetermined value, and
the value of said filtered angular velocity around the y axis at each time instant in which the value of said filtered linear acceleration along the x axis is equal to said predetermined value,
send to said processing unit:
the time instants in which the value of said filtered linear acceleration along the x axis is equal to said predetermined value,
the value of said filtered angular velocity around the y axis at said time instants.
Said second electronic device is configured at least to send data to said processing data and comprises inside:
a second inertial measurement unit comprising a second gyroscope and a second accelerometer and configured to:
acquire, through said second gyroscope, the value of at least the angular velocity around the y axis), and, through said second accelerometer, the value of at least the linear acceleration along the x axis,
second storage means for storing data,
a second logic control unit, connected to said second inertial measurement unit and to said second storage means, and configured to:
receive from the second inertial measurement unit of said second electronic device, the value of said at least one angular velocity around the y axis and the value of said at least one linear acceleration along the x axis,
filter by means of a second digital the value of said at least one angular velocity around the y axis to obtain at least one filtered angular velocity around the y axis and the value of said at least one linear acceleration along the x axis to obtain at least one filtered linear acceleration along the x axis,
identify each further time instant in which the value of said filtered linear acceleration along the x axis is equal to said predetermined value,
storing in said second storing means:
each further time instant in which the value of said filtered linear acceleration along the x axis is equal to said predetermined value,
the value of said filtered angular velocity around the y axis at each further time instant in which the value of said filtered linear acceleration along the x axis is equal to said predetermined value,
send to said processing unit:
the further time instants in which the value of said filtered linear acceleration along the x axis is equal to said predetermined value,
the value of said filtered angular velocity around the y axis at said further time instants.
The processing unit is configured at least to receive data from said first electronic device and from said second electronic device and comprises inside:
third storage means in which the value of a reference angle $\alpha_{ref}$ is stored,
a third logic control unit, connected to said third storing means, and configured to:
receive the value of said filtered at least one angular velocity around the y axis associated with the first electronic device and each time instant in which the value of said at least one filtered linear acceleration along the x axis associated with the first electronic device is equal to said predetermined value,
receive the value of said at least one filtered angular velocity around the y axis associated with the second electronic device and each further time instant in which the value of said at least one filtered linear acceleration along the x axis associated with the second electronic device is equal to said predetermined value,
calculate an angle between a first axis and a second axis, wherein said first axis is an axis passing through the centre of the tyre and said first point and said second axis is an axis passing through the centre of the tyre and said second point, according to the following formula:

$$\alpha = \frac{1}{N}\sum_{i=1}^{N}\overline{\omega}'_i \cdot |\Delta t_i|$$

wherein:
N is the number of time intervals $\Delta t_i$,
$\overline{\omega}'_i$ is the mean value of the filtered angular velocities around the y axis, defined by the value of the filtered angular velocity around the y axis in an time instant of a respective time interval $\Delta t_i$, in which the respective filtered linear acceleration along the x axis is equal to a predetermined value, and from the value of the filtered angular velocity around the y axis in a further instant of time of said time interval $\Delta t_i$, in which the respective filtered linear acceleration along the x axis is equal to said predetermined value,
$\Delta t_i$ is a respective time interval $\Delta t_1, \Delta t_2, \ldots \Delta t_N$ defined by a time instant $t_{1,1}, t_{1,2}, \ldots t_{1,N}$, in which the filtered linear acceleration along the x axis is equal to a respective predetermined value and a further time instant $t_{2,1}, t_{2,2}, \ldots t_{2,N}$, in which the filtered linear acceleration long the x axis is equal to said predetermined value, each time instant $t_{1,1}, t_{1,2} \ldots t_{1,N}$ being outside a time interval $\Delta t_D$ in which a portion of said tyre comes into contact with the ground and subsequently loses contact with the ground,
compare the value of the angle calculated with the value of the reference angle $\alpha_{ref}$ stored in said third storage means,
if the value of the angle is different from the value of the reference angle $\alpha_{ref}$, calculate the difference between the value of the angle and the value of the angle $\alpha_{ref}$ to measure the slip of the tyre with respect to the rim.

Further preferred embodiments of the system are disclosed in the dependent claims.

The present invention relates also a method for measuring the slip between a tyre and a rim on which said tyre is mounted, by means of a system through the system above mentioned.

Said method comprises the following steps:
A) acquiring the value of at least one angular velocity around the y axis and the value of at least one linear acceleration along the x axis, associated with said first electronic device,
B) filtering by means of a first digital filter the value of said at least one angular velocity around the y axis to obtain at least one filtered angular velocity around the y axis and the value of said at least one linear acceleration along the x axis to obtain at least one filtered angular acceleration along the x axis,
C) identifying each time instant in which the value of said filtered linear acceleration along the x axis is equal to a predetermined value,
D) storing:
   each time instant in which the value of said filtered linear acceleration along the x axis is equal to said predetermined value, and
   the value of said filtered angular velocity around the y axis at each time instant is in which the value of said filtered linear acceleration along the x axis is equal to said predetermined value,
E) acquiring the value of said at least one angular velocity around the y axis and the value of said at least one linear acceleration along the x axis, associated with said second electronic device,
F) filtering by means of a second digital filter the value of said at least one angular velocity around the y axis to obtain at least one filtered angular velocity around the y axis and the value of said at least one linear acceleration along the x axis to obtain at least one filtered linear acceleration along the x axis,
G) identifying each further time instant in which the value of said filtered linear acceleration along the x axis is equal to said predetermined value,
H) storing:
   each further time instant in which the value of said filtered linear acceleration along the x axis is equal to said predetermined value,
   the value of said filtered angular velocity around the y axis at each further time instant in which the value of said filtered linear acceleration along the x axis is equal to said predetermined value,
I) calculating an angle ($\alpha$) according to the following formula:

$$\alpha = \frac{1}{N}\sum_{i=1}^{N}\overline{\omega}'_i \cdot |\Delta t_i|$$

wherein:
N is the number of time intervals $\Delta t_i$,
$\overline{\omega}'_i$ is the mean value of the filtered angular velocities around the y axis, defined by the value of the filtered angular velocity around the y axis in an time instant of a respective time interval $\Delta t_i$, in which the respective filtered linear acceleration along the x axis is equal to a predetermined value, and from the value of the filtered angular velocity around the y axis in a further instant of time of said time interval $\Delta t_i$, in which the respective filtered linear acceleration along the x axis is equal to said predetermined value, $\Delta t_i$ is a respective time interval $\Delta t_1, \Delta t_2, \ldots \Delta t_N$ defined by a time instant $t_{1,1}, t_{1,2}, \ldots t_{1,N}$, in which the filtered linear acceleration along the x axis associated to the first electronic device is equal to a respective predetermined value and a further time instant $t_{2,1}, t_{2,2}, \ldots t_{2,N}$, in which the filtered linear acceleration long the x axis associated to the second electronic device is equal to said predetermined value, each time instant $t_{1,1}, t_{1,2}, \ldots t_{1,N}$ being outside a time interval $\Delta t_D$ in which a portion of said tyre comes into contact with the ground and subsequently loses contact with the ground,
J) comparing the value of the angle calculated with the value of a reference angle $\alpha_{ref}$,
K) if the value of the angle is different from the value of the reference angle $\alpha_{ref}$, calculating the difference between the value of the angle and the value of the angle $\alpha_{ref}$ to measure the slip of the tyre with respect to the rim.

BRIEF DESCRIPTION OF THE DRAWINGS

The present invention will be now described, for illustrative, but not limitative purposes, according to its embodiment, making particular reference to the enclosed figures, wherein.

DETAILED DESCRIPTION OF THE INVENTION

Figure 1:
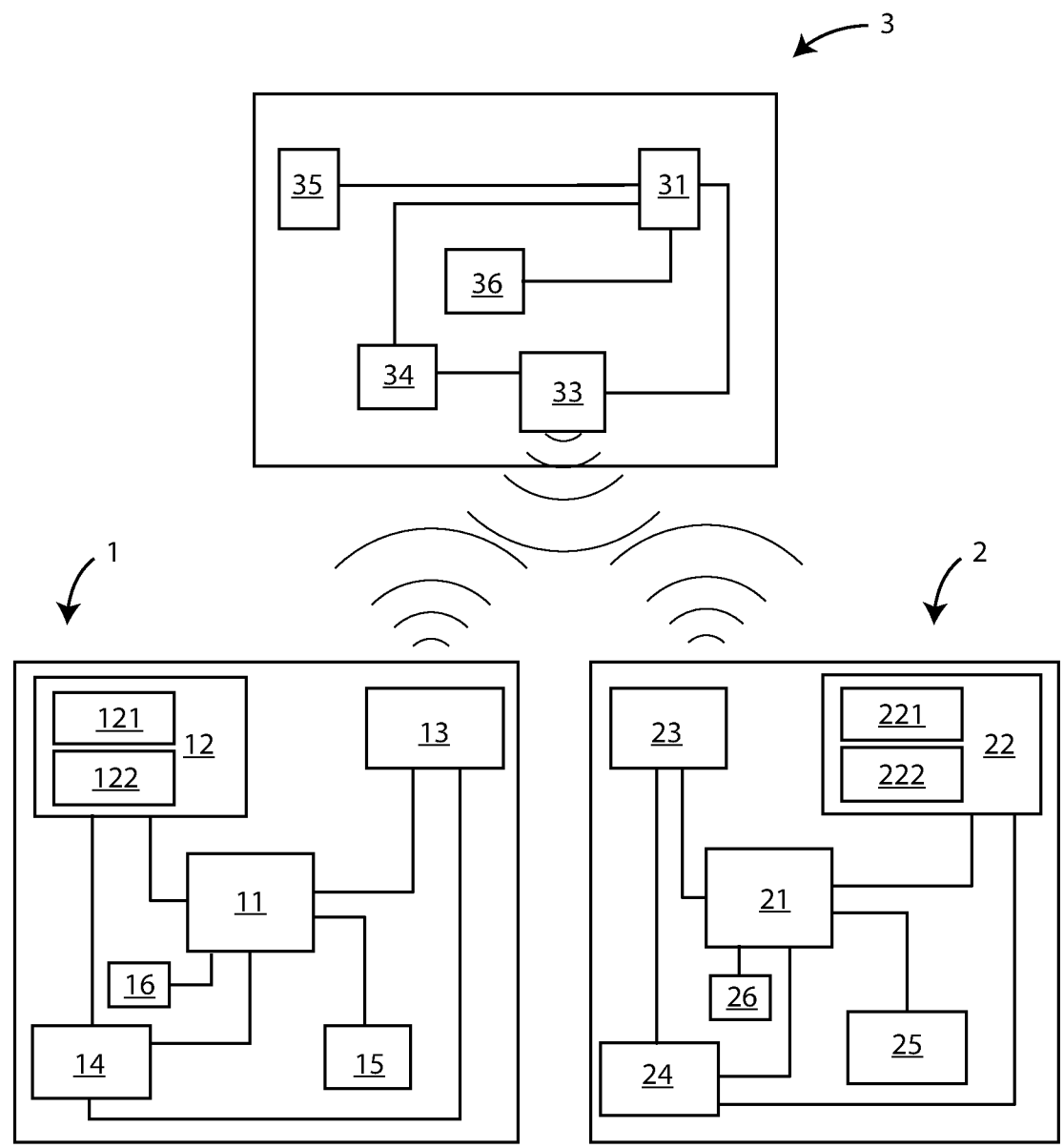
FIG. 1 is a schematic view of the components of the system object of the invention, comprising a first electronic device, a second electronic device and a processing unit, external to said electronic devices.
Figure 2A:
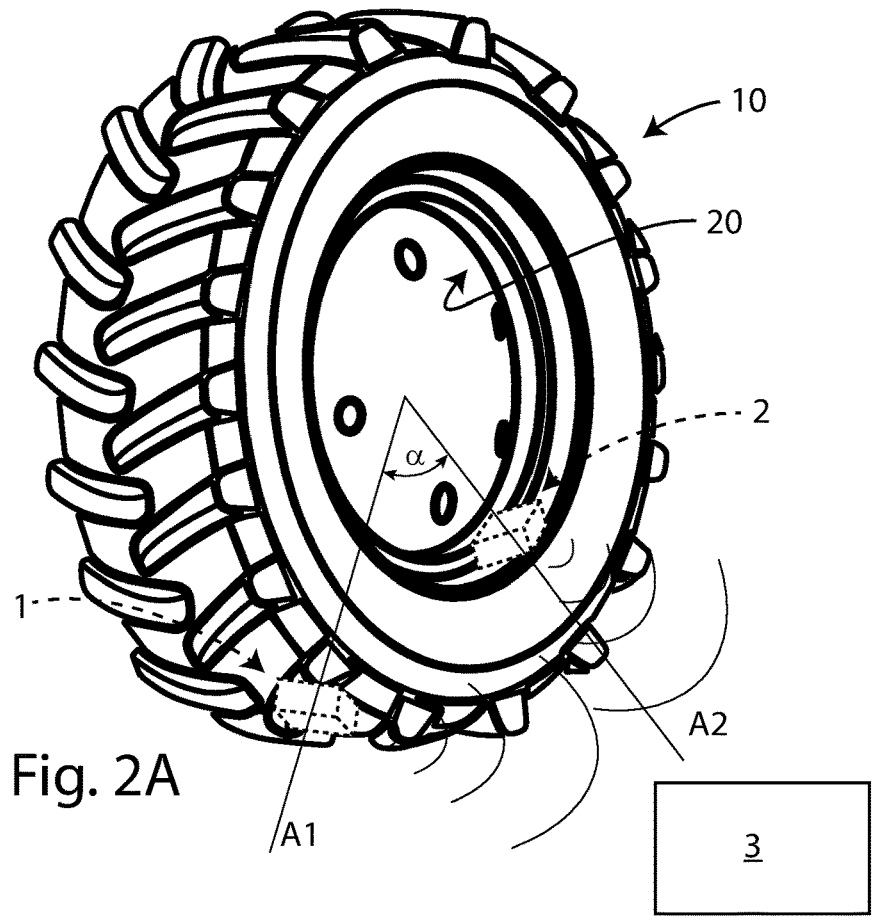
FIG. 2A is a schematic perspective view of a wheel comprising a tyre and a rim, on which the tyre is mounted, showing the first electronic device, arranged inside the tyre in such a way as to contact the inner surface of the tyre itself, the second device electronic, arranged on the channel of said rim, and a processing unit.
Figure 2B:
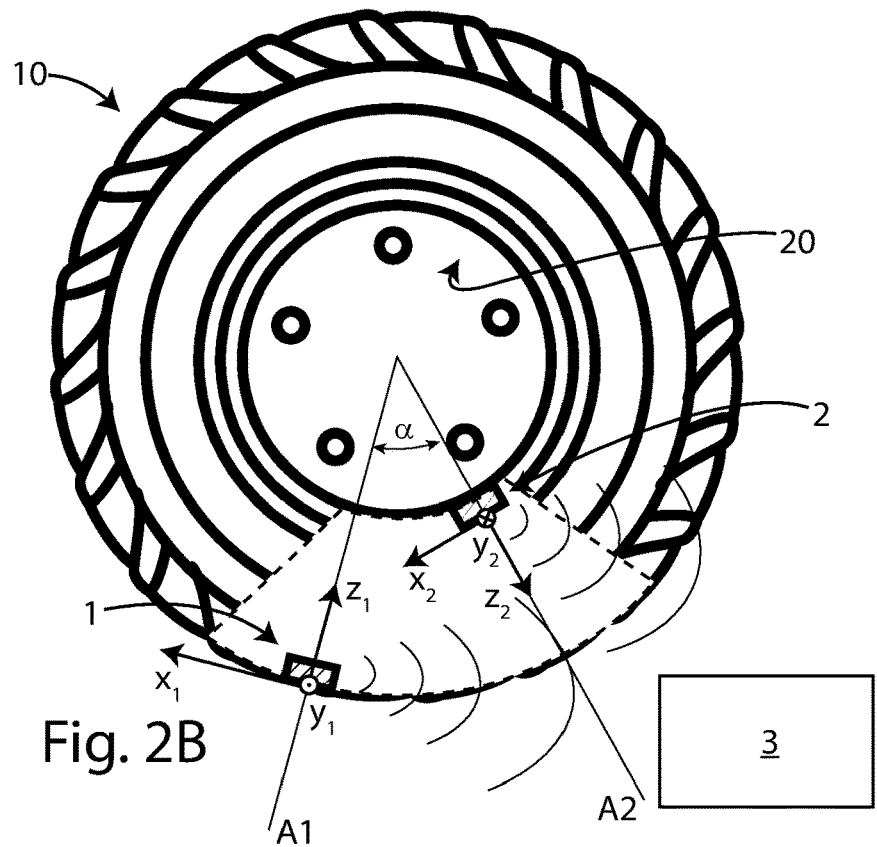
FIG. 2B is a side view of the wheel of FIG. 2A.
Figure 2C:
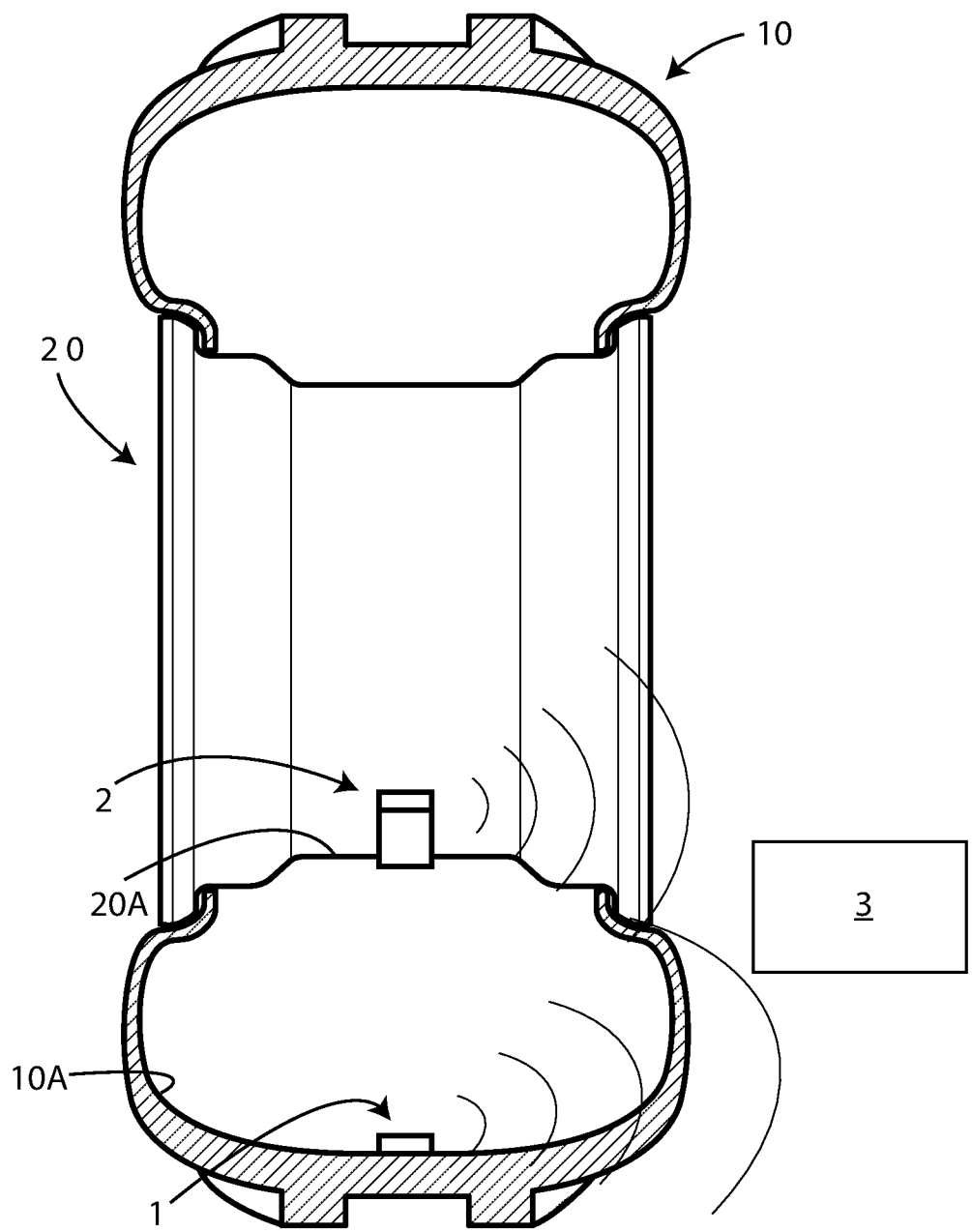
FIG. 2C is a partial sectional front view of the wheel of FIG. 2A.

With reference to FIGS. 1, 2A, 2B, 2C a system for measuring the slip between a tyre 10 and a rim 20, on which said tyre 10 is mounted.

Said system comprises:
- a first electronic device 1 to be positioned, in use, in contact with the inner surface 10A of the tyre 10,
- a second electronic device 2, to be positioned, in use, on the rim 20, in particular, in the embodiment being disclosed, on a channel 20A of the rim 20, and
- a processing unit 3, external to said electronic devices 1, 2.

In the embodiment being disclosed, a first reference system $x_1, y_1, z_1$ is associated with the first electronic device 1 in such a way that the axis $x_1$ is tangent to the rotation of a first point which is the point of said tyre 10 in which said first electronic device 1 is applied, and the axis $z_1$ is perpendicular to said axis $x_1$, and a second reference system $x_2, y_2, z_2$ is associated to the second electronic device 2 in such a way that the axis $x_2$ is tangent to the rotation of a second point which is the point of said rim 20 in which said second electronic device 2 is applied, and the is axis $z_2$ is perpendicular to said axis $x_2$.

The axis $x_1$ and the axis $z_1$ of the first reference system define a first plane.

The axis $x_2$ and the axis $z_2$ of the second reference system define a second plane.

In the embodiment being disclosed, said second plane is parallel or substantially parallel to said first plane.

However, although not shown in Figures, said first plane and said second plane can be coincident.

The slip between the tyre 10 and the rim 20 is measured by the variation of an angle a with respect to a reference angle $\alpha_{ref}$, wherein the angle a is the angle present between a first axis A1 passing through the centre of the tyre 10 and the first point which is the point of application of the first electronic device 1 on the inner surface 10A of the tyre 10 and a second axis A2 passing through the centre of the tyre 10 and the second point which is the point of application of the second electronic device 2 on the channel 20A of rim 20.

A predetermined value is associated with the value of the reference angle $\alpha_{ref}$ when the first electronic device 1 and the second electronic device 2 are positioned respectively on the internal surface 10A of a tyre 10 and on the channel 20A of the rim 20.

The variation in the value of this angle over time represents the slip of the tyre 10 with respect to the rim 20 over time.

With reference to the first electronic device 1, said first electronic device 1 comprises inside:
- first power supplying means 14 for supplying power to said first electronic device 1,
- a first wireless transceiver module 13 for transmitting and receiving signals/data to/from said processing unit 3,
- a first inertial measurement unit 12 comprising a first gyroscope 121 and a first accelerometer 122 and configured to:
  - acquire, through said first gyroscope 121, the value of at least one angular velocity around the y axis $\omega_{1y}$,
  - acquire, through said first accelerometer 122, the value of at least one linear acceleration along the x axis $A_{1x}$, wherein, in the embodiment being disclosed, the value of said linear acceleration along the x axis $A_{1x}$ is a normalized value with respect to a unit value (i.e., the value of the linear acceleration along the x axis $A_{1x}$ is between −1 and +1),
- first storage means 15 for storing data,
- a first logic control unit 11, connected with said first inertial measurement 12 and to said first storage means 15, and configured to:
  - receive from the first inertial measurement unit 12 the value of said at least one angular velocity around the y axis $\omega_{1y}$ and the value of said at least one linear acceleration along the x axis $A_{1x}$,
  - filter by means of a first digital filter the value of said at least one angular velocity around the y axis $\omega_{1y}$ to obtain at least one filtered angular velocity around the y axis $\omega_{1y}'$ and the value of said at least one linear acceleration along the x axis $A_{1x}$ to obtain at least one filtered angular acceleration along the x axis $A_{1x}'$,
  - identify each time instant in which the value of said filtered linear acceleration along the x axis $A_{1x}'$ is equal to a predetermined value,
  - store in said first storage means 15:
    - each time instant in which the value of said filtered linear acceleration along the x axis $A_{1x}'$ is equal to said predetermined value, and
    - the value of said filtered angular velocity around the y axis $\omega_{1y}'$ at each time instant in which the value of said filtered linear acceleration along the x axis $A_{1x}'$ is equal to said predetermined value,
  - send to said processing unit 3:
    - the time instants in which the value of said filtered linear acceleration along the x axis $A_{1x}'$ is equal to said predetermined value,
    - the value of said filtered angular velocity around the y axis $\omega_{1y}'$ at said time instants.

With reference to the first digital filter, in the embodiment being disclosed, said digital filter is a first IIR filter (Infinite Impulse Response).

In particular, it is preferable that said first IIR filter has a frequency between 0.1 Hz e 1 Hz.

The first logic control unit 11 can be configured to send to the processing unit 3 said time instants in which the value of said filtered linear acceleration along the x is axis $A_{1x}'$ is equal to said predetermined value and the value of said at least one filtered angular velocity around the y axis $\omega_{1y}'$ at said time instants, when the tyre 10 has completed a predetermined first number of revolutions.

Advantageously, the transmission of data to the processing unit 3 by the first electronic device 1 after a predetermined first number of revolutions allows to obtain an energy saving.

In the embodiment being described, reference will be made to a predetermined value for the filtered linear acceleration along the x axis $A_{1x}$ associated with the first electronic device 1 equal to zero and, as mentioned below, with reference to the second electronic device 2, reference will be made to a predetermined value for the filtered linear acceleration along the x axis $A_{2x}'$ associated with the second electronic device 2 equal to zero (so-called "zero-crossing technique").

However, it is possible to choose a predetermined value (both for the filtered linear acceleration along the x axis $A_{1x}'$ associated with the first electronic device 1 and for the filtered linear acceleration along the x axis $A_{2x}'$ associated with the second electronic device 2) equal to a value other than zero (but between −1 and +1), without departing from the scope of the invention.

Figure 3A:
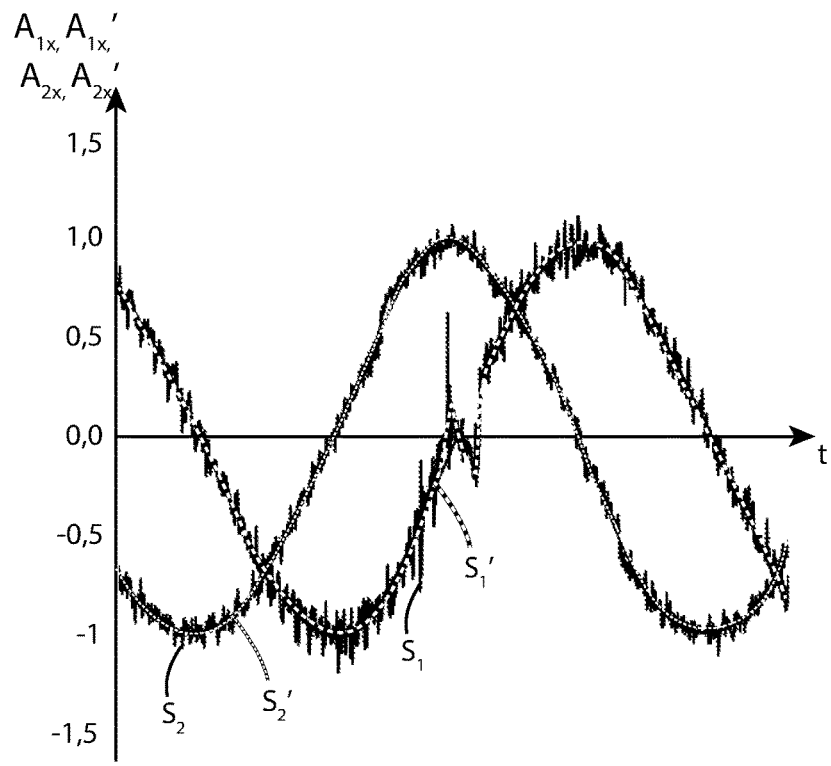
FIG. 3A shows on a Cartesian plane two sinusoids representing the linear acceleration along the x axis associated with the first electronic device over time respectively before and after the application of a first IIR filter, when the first electronic device is in use, and two further sinusoids representing the linear acceleration along the x axis associated with the second electronic device over time, respectively before and after the application of a second IIR filter, when the second electronic device is in use.
Figure 3B:
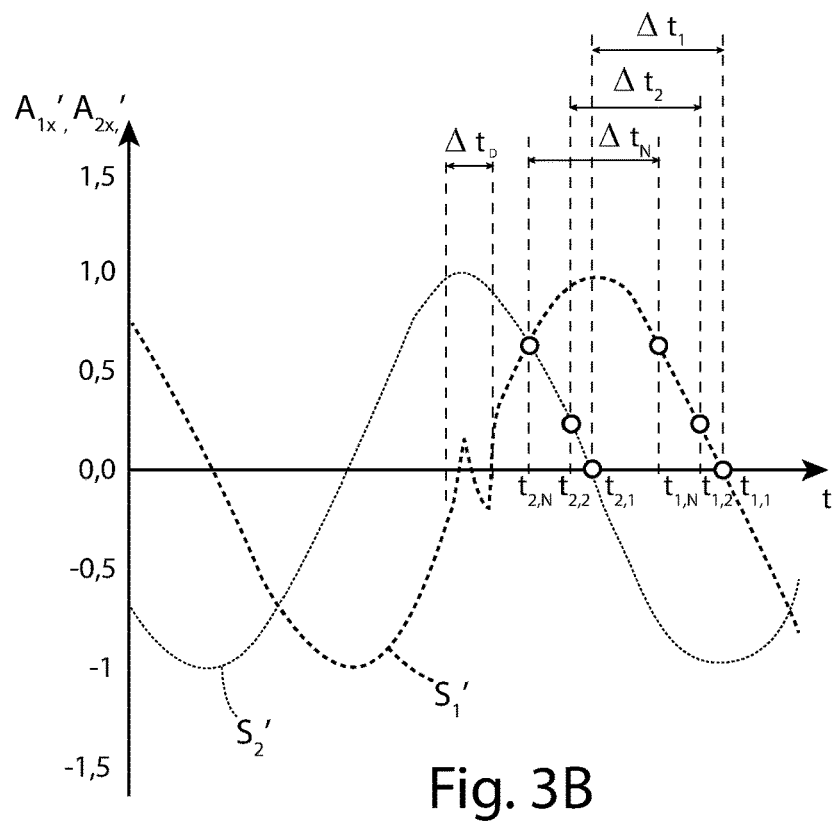
FIG. 3B shows in detail on a Cartesian plane the sinusoid representing the linear acceleration along the filtered x axis associated with the first electronic device and the sinusoid representing the linear acceleration along the filtered x axis associated with the second electronic device.

Each time instant in which the value of said filtered linear acceleration along the x axis $A_{1x}$ is zero corresponds to the time instants in which a first filtered sinusoid $S_1'$ associated with said at least one filtered linear acceleration along the x axis $A_{1x}'$ of the first electronic device 1 changes sign, (as can be seen in FIGS. 3A and 3B explained below).

The first sinusoid $S_1$ and the first filtered sinusoid $S_1'$ show respectively how the linear acceleration along the x axis $A_{1x}$ and the filtered linear acceleration along the x axis $A_{1x}'$, each of which is associated with the first electronic device 1, change over time.

Said first sinusoid $S_1$ presents a discontinuity at time interval $\Delta t_D$ in which a portion of the tyre 10 comes into contact with the ground and subsequently loses io contact with the ground.

Similarly, the first filtered sinusoid $S_1'$ presents the discontinuity at said time interval $\Delta t_D$ in a less pronounced way than the first sinusoid $S_1$ (i.e., the sinusoid when the first IIR filter was not applied).

In use, the tyre 10 performs a plurality of rotations.

With reference to the first electronic device 1, for each rotation of the tyre 10, it is possible to identify and store an instant of time $t_{1,1}$, in which the value of the filtered linear acceleration along the x axis $A_{1x}'$ associated with the first electronic device 1 is equal to zero.

Said instant of time $t_{1,1}$ together with a further instant of time $t_{2,1}$ referred to a second filtered sinusoid Sz' concerning the filtered linear acceleration along the x axis $A_{2x}'$ associated with the second electronic device 2 (in correspondence with which the value of this filtered linear acceleration along the x axis $A_{2x}'$ associated with the second electronic device 2 is equal to zero), define a time interval $\Delta t_1$ between said two filtered sinusoids $S_1'$, $S_2'$ (as explained below with reference FIG. 3A and particular reference to FIG. 3B).

In the embodiment being disclosed, said instant of time $t_{1,1}$ is subsequent to said further instant of time $t_{2,1}$.

Furthermore, in the embodiment being disclosed, said time interval $\Delta t_1$ is different from said time interval $\Delta t_D$.

In fact, the time interval $\Delta t_D$ is in a portion of the first sinusoid $S_1$, between −1 and +1, different from the portion of the same first sinusoid, between +1 and −1, in which the time interval of time $\Delta t_1$ is present.

However, it is sufficient that said instant of time $t_{1,1}$ is outside the time interval $\Delta t_D$.

In the example being disclosed, said first storage means 15 are external to the first control logic unit 11.

However, said storage means 15 can be included in said first logic control unit 11, without departing from the scope of the invention.

With particular reference to the second electronic device 2, as already mentioned, in the embodiment being disclosed, said second electronic device 2 is arranged on a channel 20A of the rim 20.

However, said second electronic device 2 can be arranged on the rim 20 in any position, for example on the outer surface of the rim 20, i.e., the surface facing outwards, or even on the disc of the rim without departing the scope of the invention.

Said second electronic device 2 comprises inside:
second power supplying means 24 for supplying power to said second electronic device 2,
a second wireless transceiver module 23 for transmitting and receiving signals/data to/from said processing unit 3,
a second inertial measurement unit 22 comprising a second gyroscope 221 and a second accelerometer 222 and configured to:
  acquire, through said second gyroscope 221, the value of at least the angular velocity around the y axis $\omega_{2y}$, and
  acquire, through said second accelerometer 222, the value of at least the linear acceleration along the x axis $A_{2x}$, wherein, in the embodiment being disclosed, the value of said linear acceleration along the x axis $A_{2x}$ is a normalized value respect to a unit value (i.e., the value of the linear acceleration along the x axis $A_{2x}$ is between −1 and +1),
second storage means 25 for storing data,
a second logic control unit 21, connected to said second inertial measurement unit 22, to said second wireless transceiver module 23 and to said second storage means 25, and configured to:
  receive from the second inertial measurement unit 22 of said second electronic device 2, the value of said at least one angular velocity around the y axis $\omega_{2y}$, and the value of said at least one linear acceleration along the x axis $A_{2x}$,
  filter by means of a second digital the value of said at least one angular velocity around the y axis $\omega_{2y}$ to obtain at least one further angular velocity or filtered angular velocity around the y axis $\omega_{2y}'$ and the value of said at least one linear acceleration along the x axis $A_{2x}$ to obtain at least one further linear acceleration or filtered linear acceleration along the x axis $A_{2x}'$,
  identify each further time instant in which the value of said filtered linear acceleration along the x axis $A_{2x}'$ is equal to said predetermined value (i.e., the predetermined value chosen for the filtered linear acceleration along the x axis $A_{1x}'$ is associated with the first electronic device 1),
  storing in said second storage means 25 each further time instant in which the value of said filtered linear acceleration along the x axis $A_{2x}$ is equal to said predetermined value,
  storing in said second storage means 25 the value of said filtered angular velocity around the y axis $\omega_{2y}'$ at each further time instant in which the value of said filtered linear acceleration along the x axis $A_{2x}'$ is equal to said predetermined value,
  send to said processing unit 3:
    the further time instants in which the value of said filtered linear acceleration along the x axis A2x' is equal to said predetermined value,
    the value of said filtered angular velocity around the y axis ω2y' at said further time instants.

With reference to the second digital filter, in the embodiment being disclosed, said second digital filter is a second IIR filter.

In particular, it is preferable that said second IIR filter has a frequency between 0.1 Hz and 1 Hz.

The second logic control unit 21 can be configured to send to the processing unit 3 said further time instants in which the value of said filtered linear acceleration along the x axis $A_{2x}'$ is equal to said predetermined value and the value of said at least one filtered angular velocity around the y axis $\omega_{2y}'$ at said time instants when the tyre 10 has completed a predetermined second number of revolutions.

Advantageously, the transmission of data to the processing unit 3 by said second electronic device 2 after a predetermined second number of revolutions allows to obtain an energy saving.

In the embodiment being described, as already mentioned, reference will be made to a predetermined value for the filtered linear acceleration along the x axis $A_{2x}'$ associated with the second electronic device 2 equal to zero.

The further time instants in which the value of said filtered linear acceleration along the x axis $A_{2x}'$ is zero are the time instants in which a second filtered sinusoid $S_2'$ associated with the filtered linear acceleration along the x axis $A_{2x}'$ of the second electronic device 2 changes sign (FIGS. 3 and 4).

The second sinusoid S2 and the second filtered sinusoid $S_2'$ show respectively how the linear acceleration along the x axis $A_{2x}$ and the filtered linear acceleration along the x axis $A_{2x}'$, each of which is associated with the second electronic device 2, change over time.

As already mentioned, in use, the tyre 10 performs a plurality of rotations. Consequently, also the rim 20 performs a plurality of rotations.

With reference to the second electronic device 2, for each rotation, it is possible to identify and store a further instant of time $t_{2,1}$ in which the value of the filtered is linear acceleration along the x axis $A_{2x}'$ associated with the second electronic device 2 is equal to zero.

With reference to digital filters, and in particular to the IIR filters mentioned above, these IIR filters allow to remove the noise mainly due to vibrations, mechanical transmissions, and ground irregularities.

With reference to both electronic devices 1,2 of the system, each electronic device 1, 2 is respectively fixed to the tyre 10 and to the rim 20 by means of a respective fixing device resistant to dust and water (not shown).

With particular reference to the processing unit 3, said processing unit 3 comprises inside:
- third power supplying means 34 for supplying power to said processing unit 3,
- a third wireless transceiver module 33 for transmitting and receiving signals/data to/from said first electronic device 1 and said second electronic device 2,
- third storage means 35 in which the value of a reference angle $\alpha_{ref}$ is stored,
- a third logic control unit 31, connected to said third wireless transceiver module 33, to said third power supplying means 34 and to said third storage means 35, and configured to:
  - receive the value of said filtered at least one angular velocity around the y axis $\omega_{1y}'$ associated with the first electronic device 1 and each time instant in which the value of said at least one filtered linear acceleration along the x axis $A_{1x}'$ associated with the first electronic device 1 is equal to said predetermined value,
  - receive the value of said at least one filtered angular velocity around the y axis $\omega_{2y}'$ associated with the second electronic device 2 and each further time instant in which the value of said at least one filtered linear acceleration along the x axis $A_{2x}'$ associated with the second electronic device 2 is equal to said predetermined value,
  - calculate an angle a between a first axis A1 and a second axis A2, wherein said first axis A1 is an axis passing through the centre of the tyre 10 and said first point (i.e., the point of the tyre 10 in which said first electronic device 1 is applied) and said second axis A2 is an axis passing through the centre of the tyre 10 and said second point (i.e., the point of the rim 20 in which said second electronic device 2 is applied), according to the following formula:

$$\alpha = \overline{\omega'} \cdot |\Delta t_1| = \frac{\omega'_{1y_{t_{1,1}}} + \omega'_{2y_{t_{2,1}}}}{2} \cdot |\Delta t_1| = \frac{\omega'_{1y_{t_{1,1}}} + \omega'_{2y_{t_{2,1}}}}{2} \cdot |t_{1,1} - t_{2,1}|$$

wherein:
- $\overline{\omega'}$ is the mean value of the filtered angular velocities around the y axis, defined by the value of the filtered angular velocity around the y axis $\omega_{1y}'$ associated to the first electronic device 1 in the time instant $t_{1,1}$ in which the respective filtered linear acceleration along the x axis $A_{1x}$ is equal to said predetermined value (i.e., zero in the embodiment being disclosed) and by the value of the filtered angular velocity around the y axis $\omega_{2y}'$ associated to the second electronic device 2 in the further time instant $t_{2,1}$ in which the respective filtered linear acceleration along the x axis $A_{2x}'$ is equal to said predetermined value (i.e., zero in the embodiment being disclosed);
- $\Delta t_1 = t_{1,1} - t_{2,1}$ is the time interval between a time instant $t_{1,1}$ in which the filtered linear acceleration along the x axis $A_{1x}'$ associated to the first electronic device 1 is equal to said predetermined value (i.e., zero in the embodiment being disclosed) and a further time instant $t_{2,1}$, in which the filtered linear acceleration along the x axis $A_{2x}'$ associated to the second electronic device 2 is equal to said predetermined value (i.e., zero in the embodiment being disclosed), wherein said time instant and said further time instant are successive time instants,
- compare the value of the angle α calculated with the value of the reference angle $\alpha_{ref}$ stored in said third storage means 35,
- if the value of the angle α is different from the value of the reference angle $\alpha_{ref}$, calculate the difference between the value of the angle α and the value of the angle $\alpha_{ref}$ to measure the slip of the tyre 10 with respect to the rim 20.

In the embodiment being disclosed, a single time interval and a single pair of filtered angular velocities around the y axis have been taken into account for the calculation of the angle a, wherein said pair of filtered angular velocities around the y axis is formed by a value of the filtered angular velocity around the y axis $\omega_{1y}'$ associated with the first electronic device 1 at said time instant $t_{1,1}$ and a value of the filtered angular velocity around the y axis $\omega_{2y}'$ associated with the second electronic device 2 at said further instant of time $t_{2,1}$.

However, for calculating the angle a, it is possible to select a plurality of time intervals $\Delta t_1, \Delta t_2, \ldots \Delta t_N$, each of which is defined by a respective pair of time instants (i.e., a pair formed by a respective time instant in which the filtered linear acceleration along the x axis $A_{1x}'$ associated to the first electronic device 1 is equal to a respective predetermined value and by a respective further time instant in which the filtered linear acceleration along the x axis $A_{2x}'$ associated to the second electronic device 2 is equal to said predetermined value) and to take into account the value of the filtered angular velocity around the y axis $\omega_{1y}'$ associated to the first electronic device 1 at the respective time instant and the value of the filtered angular velocity around the y axis $\omega_{2y}'$ associated to the second electronic device 2 at the respective further time instant.

Consequently, the angle $\alpha$ can be calculated according to the following formula:

$$\alpha = \frac{1}{N}\sum_{i=1}^{N}\overline{\omega}_i' \cdot |\Delta t_i| =$$

$$\frac{1}{N}\left[\left(\frac{\omega'_{1y_{t1,1}} + \omega'_{2y_{t2,1}}}{2}\right)\cdot|\Delta t_1| + \left(\frac{\omega'_{1y_{t1,2}} + \omega'_{1y_{t2,2}}}{2}\right)\cdot|\Delta t_2| + \ldots + \right.$$

$$\left.\left(\frac{\omega'_{1y_{t1,N}} + \omega'_{1y_{t2,N}}}{2}\right)\cdot|\Delta t_N|\right] = \frac{1}{N}\left[\left(\frac{\omega'_{1y_{t1,1}} + \omega'_{2y_{t2,1}}}{2}\right)\cdot|t_{1,1} - t_{2,1}| + \right.$$

$$\left.\left(\frac{\omega'_{1y_{t1,2}} + \omega'_{1y_{t2,2}}}{2}\right)\cdot|t_{1,2} - t_{2,2}| + \ldots + \left(\frac{\omega'_{1y_{t1,N}} + \omega'_{1y_{t2,N}}}{2}\right)\cdot|t_{1,N} - t_{2,N}|\right]$$

wherein:

N is the number of time intervals $\Delta t_i$, in which each time interval $\Delta t_i$ is defined by a respective time instant in which the filtered linear acceleration along the x axis $A_{1x}'$ associated to the first electronic device 1 is equal to a respective predetermined value and a respective further time instant in which the filtered linear acceleration along the x axis $A_{2x}'$ associated to the second electronic device 2 is equal to said predetermined value, $\overline{\omega}_i'$ is the mean value of the filtered angular velocities around the y axis defined by the value of the filtered angular velocity around the y axis $\omega_{1y}'$ associated to the first electronic device 1 in a time instant of a respective time interval $\Delta t_i$, in which the respective filtered linear acceleration along the x axis $A_{1x}'$ is equal to a predetermined value and by the value of the filtered angular velocity along the y axis $\omega_{2y}'$ associated to the second electronic device 2 in a further time instant of said time interval $\Delta t_i$, in which the respective filtered linear acceleration along the x axis $A_{2x}$40 is equal to said predetermined value, $\Delta t_i$ is a respective time interval defined by a time instant in which the filtered linear acceleration $A_{1x}'$ associated to the first electronic device 1 is equal to a respective predetermined value and by a further time instant, in which the filtered linear acceleration along the x axis $A_{2x}'$ associated to the second electronic device 2 is equal to said predetermined value.

In the case where N is equal to 1 (i.e., a single time interval has been selected), the formula for the calculation of the angle wherein a plurality of time intervals is mentioned will be the same as the previously mentioned formula for the calculation of the angle wherein an only time interval $\Delta t_1$ is mentioned.

It is preferable that said third logic control unit 31 of the processing unit 3 is configured to generate an alarm signal (which can be an acoustic and/or visual signal) when the calculated angle has a value that falls outside of a predetermined range of values centred on the value of said reference angle.

In particular, it is further preferable that said third logic control unit 31 is configured to generate said alarm signal when the calculated angle has a value that falls outside a predetermined range of values for a predetermined number of consecutive times.

Furthermore, said third logic control unit 31 can be configured to modify the value of said reference angle $\alpha_{ref}$.

In particular, said third logic control unit 31 can be configured to modify the value of said reference angle $\alpha_{ref}$ on the basis of the mean value of the values of the calculated angles when said values fall within said predetermined range of values centred with respect to the last angle value calculated for a certain number of consecutive times.

In this specific case, said third logic control unit 31 is configured to:
verify that the values of two or more calculated angles fall within said predetermined range of values,
calculate the mean value of said two or more calculated angles,
modify the value of said reference angle $\alpha_{ref}$ based on said mean value, when said values fall within said predetermined range of values centred with respect to the last calculated angle value, preferably for a predetermined number of consecutive times.

Said third logic control unit 31 can be configured to modify the value of the reference angle $\alpha_{ref}$ regardless of the generation of an alarm signal.

FIG. 3A shows the first sinusoid $S_1$ (represented by a solid black line) associated with the linear acceleration along the x axis $A_{1x}$ of the first electronic device 1 (i.e., the electronic device arranged on the inner surface of the tyre) and the same first filtered sinusoid $S_1'$ (represented by a white dashed line), as well as the second sinusoid $S_2$ (represented by a further continuous black line) associated with the linear acceleration around the x axis $A_{2x}$ of the second electronic device 2 (i.e., the electronic device arranged on the channel of the rim) and the same second filtered sinusoid $S_2'$ (represented by a further white dashed line).

As can be seen from FIG. 3A, as already mentioned, the first sinusoid $S_1$ (associated with the linear acceleration along the x axis $A_{1x}$ of the first electronic device 1) has a discontinuity due to the fact that, during the rotation of a tyre 10, a portion of said tyre 10 comes into contact with the ground and subsequently loses contact with the ground (and the time interval $\Delta t_D$ is the time interval in which the tyre 10 contacts the ground), while the second sinusoid S2 (associated with the linear acceleration along the x axis $A_{2x}$ of the second electronic device 2) does not present any discontinuity.

The same discontinuity, although in a less pronounced way, is present in the first filtered sinusoid $S_1'$.

The time interval $\Delta t$ indicates the time interval between a time instant in which the filtered linear acceleration along the x axis $A_{1x}'$ associated with the first electronic device 1 is equal to a predetermined value (i.e., a null value in the embodiment being described) and a further time instant in which the filtered linear acceleration along the x axis $A_{2x}'$ associated with the second electronic device 2 is equal to a predetermined value (i.e., a null value in the embodiment being disclosed).

FIG. 3A, as already mentioned, shows how the linear acceleration along the x axis associated with the first electronic device 1, before and after the application of a first filter IIR, and the linear acceleration along the x axis associated with second electronic device 2, before and after the application of a second IIR filter, change over time.

Each linear acceleration is represented by a respective sinusoid:
$S_1$ represents the first sinusoid concerning the linear acceleration along the x axis $A_{1x}$ associated with the first electronic device 1, $S_1'$ represents the first filtered sinusoid concerning the filtered linear acceleration along the x axis $A_{1x}'$ associated with the first electronic device 1, $S_2$ represents the second sinusoid concerning the linear acceleration along the x axis $A_{2x}$ associated with the second electronic device 2, $S_2'$ represents the second filtered sinusoid concerning the filtered linear acceleration along the x axis $A_{2x}'$ associated with the second electronic device 2.

The rotational movement of the tyre 10 and the rotational movement of the rim 20 are represented respectively by the first sinusoid $S_1$ and the second sinusoid $S_2$ on a Cartesian plane, in which the abscissa axis is the time and the ordinate axis is the acceleration linear along the x axis when associated respectively with the first electronic device 1 and with the second electronic device 2.

Each of said sinusoids $S_1$, $S_2$ is filtered by a respective IIR filter to remove the noise due to the factors (for example vibrations, mechanical transmissions, ground irregularities, etc.).

The time instant $t_{1,1}$ corresponds to the point in which the first filtered sinusoid $S_1'$ intercepts the abscissa axis of said Cartesian plane.

The time instant $t_{2,1}$ corresponds to the point in which the second filtered sinusoid Sz' intercepts the abscissa axis of said Cartesian plane.

As already mentioned, and as can be seen from FIG. 3A, the first sinusoid $S_1$ and therefore also the first filtered sinusoid $S_1'$ presents a discontinuity in correspondence with a time interval $\Delta t_D$ in which a portion of the tyre 10 comes into contact with the ground and subsequently loses contact with the ground.

Each time interval $\Delta t_1$, $\Delta t_2$, . . . $\Delta t_N$ falls outside the time interval $\Delta t_D$ at which the discontinuity is present, and does not overlap this time interval.

FIG. 3B shows in detail the first filtered sinusoid $S_1'$ and the second filtered sine wave $S_2'$, as well as the time intervals $\Delta t_1$, $\Delta t_2$, . . . $\Delta t_N$ for greater clarity.

Figure 4A:
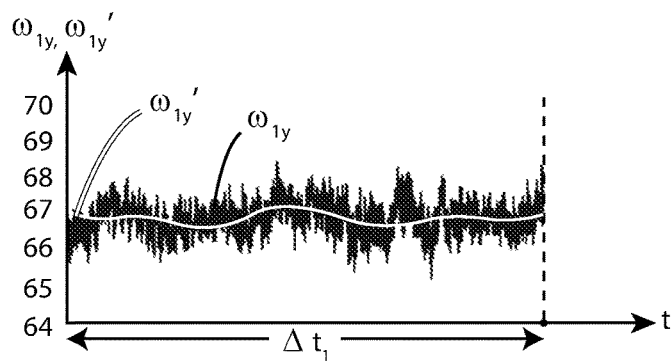
FIG. 4A shows two portions of sinusoids representing the angular velocity around the y axis, associated with the first electronic device, in a time interval $\Delta t_1$, respectively before and after the application of a first IIR filter, when the first electronic device is in use.

FIG. 4A shows in the same time interval $\Delta t_1$ the filtered angular velocity around the y axis $\omega_{1y}'$ associated with the first electronic device 1 and the filtered angular velocity around the y axis $\omega_{1y}$, i.e., the angular velocity which has not been filtered by the first filter IIR, when the first electronic device 1 is in use.

The angular velocity around the y axis $\omega_{1y}$ is represented by a black solid line and the filtered angular velocity around the y axis $\omega_{1y}'$ is represented by a white solid line.

Figure 4B:
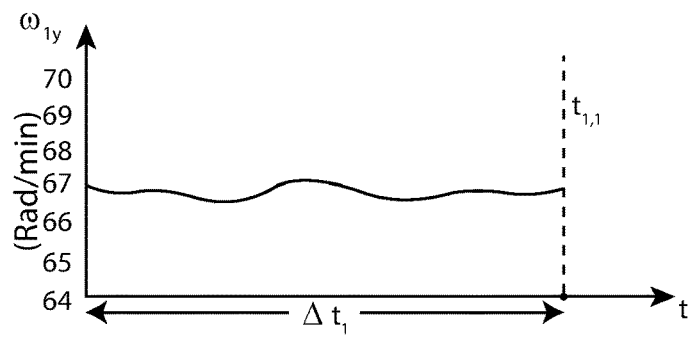
FIG. 4B shows on a Cartesian plane the sinusoid representing the angular velocity around the filtered y axis, associated with the first electronic device, in said time interval $\Delta t_1$.

FIG. 4B shows in detail the filtered angular velocity around the filtered y axis $\omega_{1y}'$ associated with the first device 1 in the time interval $\Delta t_1$.

Figure 5A:
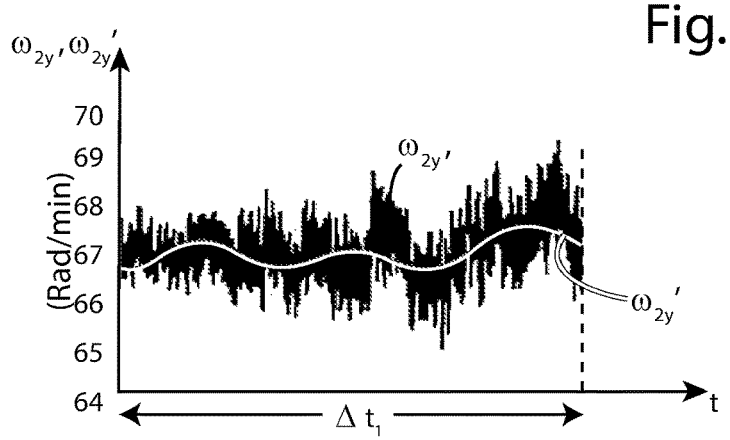
FIG. 5A shows two portions of sinusoids representing the angular velocity around the y axis, associated with the second electronic device, in a time interval $\Delta t_1$, respectively before and after the application of a second IIR filter, when the second electronic device is in use.

FIG. 5A shows in the same time interval $\Delta t_1$ the filtered angular velocity around the y axis filtered $\omega_{2y}'$ associated with the second electronic device 2 and the angular velocity around the y axis $\omega_{2y}$, i.e., the angular velocity which has not been filtered by the second filter IIR, when the second electronic device 2 is in use.

The filtered angular velocity around the y axis $\omega_{2y}$ is represented by a black solid line and the filtered angular velocity around the y axis $\omega_{2y}'$ is represented by a white solid line.

Figure 5B:
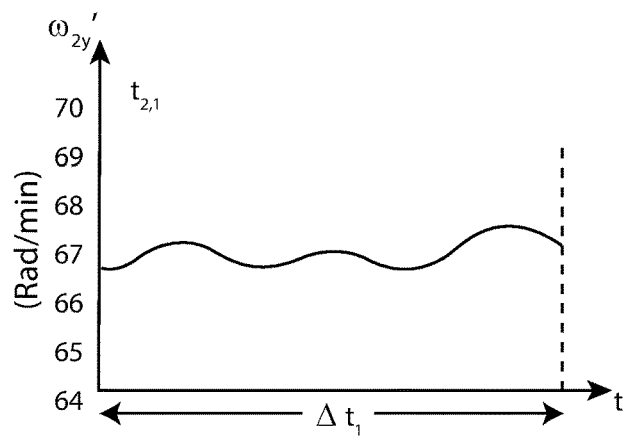
FIG. 5B shows on a Cartesian plane the sinusoid portion representing the angular velocity around the filtered y axis, associated with the second electronic device, in said time interval $\Delta t_1$.

FIG. 5B shows in detail the filtered angular velocity around the y axis $\omega_{2y}'$ associated with the second device 2 in the time interval $\Delta t_1$.

Furthermore, said first electronic device 1 can be provided with a first clock source 16, connected to the first logic control unit 11, and said second electronic device 2 can be provided with a second clock source 26, connected to the second logic unit control 21, and said processing unit 3 can be provided with a third clock source 36, connected to the third logic control unit.

In particular, said third logic control unit 31 of the processing unit 3 is configured to:

send a synchronism signal to said first electronic device 1 and to said second electronic device 2 to synchronize the respective clock sources to the third clock source 36 of said processing unit 3, so that all the clock sources are synchronous, on the basis of a predetermined temporal resolution, which may be required by the circumstances.

It is preferable that said synchronism signal is sent periodically, for example when the tyre 10 has completed a predetermined number of revolutions.

The sending of a synchronism signal is not necessary if each of the electronic devices is configured only to send data to the processing unit 3 and the latter is configured to receive and process such data.

In the variant in which each electronic device 1,2 is configured only to acquire and send data (after filtering them) to the processing unit 3 and the latter is configured to receive and process such data to calculate the slip of the tyre with respect to the rim, the first wireless transceiver module (arranged in the first electronic device 1) is replaced by a first wireless transmission module, the second wireless transceiver module (arranged in the second electronic device 2) is replaced by a second wireless transmission module and the third transceiver module wireless (arranged in processing unit 3) is replaced by a wireless receiving module.

Furthermore, the logic control unit of the processing unit 3, i.e., the third logic control unit 31, is configured to:

store the respective reception time instant in which said third logic control unit 31 receives the value of the filtered angular velocity around they axis $\omega_{1y}'$ associated with the first electronic device 1 and the value of the filtered angular velocity around to the y axis $\omega_{2y}'$ associated with the second electronic device 2, based on the time established by the third clock source 36, obtain:

the time instant in which the first electronic device 1 has stored the value of said further filtered angular velocity around the y axis $\omega_{1y}'$, subtracting at the reception time instant a first time interval $\Delta t_{1_{AT}}$ referred to the time between the acquisition and the transmission of the value of said further filtered angular velocity around the y axis $\omega_{1y}'$ to the processing unit 3 and a second time interval $\Delta t_{1_V}$ due to the time required to said further filtered angular velocity around the y axis $\omega_{1y}'$ to reach said processing unit 3 (i.e., the time to pass through the transmission medium present between the first electronic device 1 and the processing unit 3), and the time instant in which the second electronic device 2 has stored the value of said further filtered angular velocity around they axis $\omega_{2y}'$, subtracting at the reception time instant a further first time interval $\Delta t_{2_{AT}}$ referred to the time between the acquisition and the transmission of the value of said furtherfiltered angular velocity around the y axis $\omega_{2y}'$ to the processing unit 3 and a further second time interval $\Delta t_{2_V}$ due to the time necessary for said further filtered angular velocity around the y axis $\omega_{2y}'$ to reach said processing unit 3 (i.e., the time to travel the transmission medium present between the second electronic device 2 and the processing unit 3), calculate the time interval between said two time instants obtained.

With reference to the time required to pass through the transmission medium present between each electronic device 1,2 and the processing unit 3, this time may depend on various factors, such as the respective distance between each electronic device 1,2 and the unit processing 3 and the type of transmission medium itself.

In this case, (i.e., if the electronic devices are designed to acquire and transmit data and the processing unit is designed to receive and process said data), an energy saving is obtained due to the fact that the electronic devices 1, 2 receive no signals from the data processing unit 3.

As it is clear from the above, each electronic device 1,2 can be configured to acquire and transmit data (after filtering them) and the processing unit 3 to receive and process such data to calculate the angle and compare it with a reference angle or each electronic device can be configured to acquire and transmit data, as well as to receive one or more signals from the processing unit (such as a synchronism signal) and the processing unit can be configured to receive and process such data to calculate the angle and compare it with a reference angle, as well as to send one or more signals to each of said electronic devices (such as for example a synchronism signal).

The present invention relates to also a method for measuring the slip between a tyre 10 and a rim 20 on which said tyre 10 is mounted, by means of a system above disclosed.

Said method comprises the following steps:
A) acquiring the value of at least one angular velocity around the y axis $\omega_{1y}$ and the value of at least one linear acceleration along the x axis $A_{1x}$, associated with said first electronic device 1,
B) filtering by means of a first digital filter the value of said at least one angular velocity around the y axis $\omega_{1y}$ to obtain at least one filtered angular velocity around the y axis $\omega_{1y}'$ and the value of said at least one linear acceleration along the x axis $A_{1x}$ to obtain at least one filtered angular acceleration along the x axis $A_{1x}'$,
C) identifying each time instant in which the value of said filtered linear acceleration along the x axis $A_{1x}'$ is equal to a predetermined value,
D) storing:
  each time instant in which the value of said filtered linear acceleration along the x axis $A_{1x}'$ is equal to said predetermined value, and
  the value of said filtered angular velocity around the y axis $\omega_{1y}'$ at each time instant in which the value of said filtered linear acceleration along the x axis $A_{1x}'$ is equal to said predetermined value,
E) acquiring the value of said at least one angular velocity around the y axis $\omega_{2y}$ and the value of said at least one linear acceleration along the x axis $A_{2x}$, associated with said second electronic device 2,
F) filtering by means of a second digital filter the value of said at least one angular velocity around the y axis $\omega_{2y}$ to obtain at least one filtered angular velocity around the y axis $\omega_{2y}'$ and the value of said at least one linear acceleration along the x axis $A_{2x}$ to obtain at least one filtered linear acceleration along the x axis $A_{2x}'$,
G) identifying each additional time instant in which the value of said filtered linear acceleration along the x axis $A_{2x}'$ is equal to said predetermined value,
H) storing:
  each further time instant in which the value of said filtered linear acceleration along the x axis $A_{2x}'$ is equal to said predetermined value,
  the value of said filtered angular velocity around the y axis $\omega_{2y}'$ at each further time instant in which the value of said filtered linear acceleration along the x axis $A_{2x}'$ is equal to said predetermined value,
I) calculating an angle α according to one of the following formulas (on the basis of number of time intervals to be taken into account):

$$\alpha = \overline{\omega'} \cdot |\Delta t_1| = \frac{\omega'_{1y_{t1,1}} + \omega'_{2y_{t2,1}}}{2} \cdot |\Delta t_1| = \frac{\omega'_{1y_{t1,1}} + \omega'_{2y_{t2,1}}}{2} \cdot |t_{1,1} - t_{2,1}|$$

wherein:
  $\overline{\omega'}$ is the mean value of the angular velocities filtered around the y axis $\omega_{1y}'$, $\omega_{2y}'$,
  $\Delta t_1 = t_{1,1} - t_{2,1}$ is the time interval between a time instant $t_{1,1}$ in which the filtered linear acceleration along the x axis $A_{1x}'$ is equal to said predetermined value and a further instant of time $t_{2,1}$, in which the filtered linear acceleration along the x axis $A_{2x}'$ is equal to said predetermined value, or $$\alpha = \frac{1}{N} \sum_{i=1}^{N} \overline{\omega'_i} \cdot |\Delta t_i| =$$

$$\frac{1}{N} \left[ \left( \frac{\omega'_{1y_{t1,1}} + \omega'_{2y_{t2,1}}}{2} \right) \cdot |\Delta t_1| + \left( \frac{\omega'_{1y_{t1,2}} + \omega'_{1y_{t2,2}}}{2} \right) \cdot |\Delta t_2| + \ldots + \left( \frac{\omega'_{1y_{t1,N}} + \omega'_{1y_{t2,N}}}{2} \right) \cdot |\Delta t_N| \right] = \frac{1}{N} \left[ \left( \frac{\omega'_{1y_{t1,1}} + \omega'_{2y_{t2,1}}}{2} \right) \cdot |t_{1,1} - t_{2,1}| + \left( \frac{\omega'_{1y_{t1,2}} + \omega'_{1y_{t2,2}}}{2} \right) \cdot |t_{1,2} - t_{2,2}| + \ldots + \left( \frac{\omega'_{1y_{t1,N}} + \omega'_{1y_{t2,N}}}{2} \right) \cdot |t_{1,N} - t_{2,N}| \right]$$

wherein:
  N is the number of time intervals $\Delta t_i$,
  $\overline{\omega'_i}$ is the mean value of the filtered angular velocities around the y axis, defined by the value of the filtered angular velocity around the y axis $\omega_{1y}'$ in an time instant of a respective time interval $\Delta t_i$, in which the respective filtered linear acceleration along the x axis $A_{1x}'$ is equal to a predetermined value, and from the value of the filtered angular velocity around the y axis $\omega_{2y}'$ in a further instant of time of said time interval $\Delta t_i$, in which the respective filtered linear acceleration along the x axis $A_{2x}'$ is equal to said predetermined value,
  $\Delta t_i$ is a respective time interval defined by a time instant in which the filtered linear acceleration along the filtered x axis $A_{1x}'$ associated with the first electronic device 1 is equal to a respective predetermined value and a further instant of time, in which the filtered linear acceleration along the x axis $A_{2x}'$ associated with the second electronic device 2 is equal to said predetermined value,
  $\Delta t_1, \Delta t_2, \ldots \Delta t_N$ are time intervals between respective time instants $t_{1,1}, t_{1,2}, \ldots t_{1,N}$ in which the filtered linear acceleration along the x axis $A_{1x}'$ is equal to said predetermined value and respective further instants of time $t_{2,1}, t_{2,2}, \ldots t_{2,N}$ in which the filtered linear acceleration along the x axis $A_{2x}'$ is equal to said predetermined value, J) comparing the value of the angle α calculated with the value of a reference angle $\alpha_{ref}$, K) if the value of the angle a is different from the value of the reference angle $\alpha_{ref}$, calculating the difference between the value of the angle α and the value of the angle $\alpha_{ref}$ to measure the slip of the tyre 10 with respect to the rim 20.

As already said for the system, said first digital filter and said second digital filter are respectively a first IIR filter and a second IIR filter.

Furthermore, in case N is equal to 1 (i.e., a single time interval has been selected), the formula of the angle in which a plurality of time intervals is mentioned will be equal to the formula of the angle in which it has been mentioned only the time interval $\Delta t_1$.

Advantageously, as already mentioned, by means of the system and the method, object of the invention, it is possible to measure the slip over time of a tyre with respect to the rim on which said tyre is mounted, when the tyre is in use.

Consequently, as mentioned, the measurement of the slip between tyre and rim is a dynamic measurement.

The present invention has been described for illustrative, but not limitative purposes, according to its preferred embodiments, but it is to be understood that variations and/or modifications can be carried out by a skilled in the art, without departing from the scope thereof, as defined according to enclosed claims.

The invention claimed is:

1. System for measuring the slip between a tyre (10) and a rim (20) on which said tyre (10) is mounted, said system comprising:
    a first electronic device (1) to be positioned, in use, in contact with the inner surface (10A) of the tyre (10),
    a second electronic device (2), to be positioned, in use, in contact with said rim (20),
    a processing unit (3), external to said electronic devices (1, 2),
    wherein:
    a first reference system $x_1, y_1, z_1$ is associated with the first electronic device (1) in such a way that the axis $x_1$ is tangent to the rotation of a first point which is a point of said tyre (10) in which said first electronic device (1) is applied, e the axis $z_1$ is perpendicular to said axis $x_1$,
    a second reference system $x_2, y_2, z_2$ is associated with the second electronic device (2) in such a way that the axis $x_2$ is tangent to the rotation of a second point which is a point of said rim (20) in which said second electronic device (2) is applied, and the axis $z_2$ is perpendicular to said axis $x_2$,
    said first electronic device (1) is configured at least to send data to said processing unit (3) and comprises inside:
    a first inertial measurement unit (12) comprising a first gyroscope (121) and a first accelerometer (122) and configured to:
        acquire, through said first gyroscope (121), the value of at least one angular velocity around the y axis ($\omega_{1y}$), and, through said first accelerometer (122), the value of at least one linear acceleration along the x axis ($A_{1x}$),
    first storage means (15) for storing data,
    a first logic control unit (11), connected with said first inertial measurement (12) and to said first storage means (15), and configured to:
        receive from the first inertial measurement unit (12) the value of said at least one angular velocity around the y axis ($\omega_{1y}$) and the value of said at least one linear acceleration along the x axis ($A_{1x}$),
        filter by means of a first digital filter the value of said at least one angular velocity around the y axis ($\omega_{1y}$) to obtain at least one filtered angular velocity around the y axis ($\omega_{1y}'$) and the value of said at least one linear acceleration along the x axis ($A_{1x}$) to obtain at least one filtered angular acceleration along the x axis ($A_{1x}'$),
        identify each time instant in which the value of said filtered linear acceleration along the x axis ($A_{1x}'$) is equal to a predetermined value,
        store in said first storage means (15):
        each time instant in which the value of said filtered linear acceleration along the x axis ($A_{1x}'$) is equal to said predetermined value, and
        the value of said filtered angular velocity around the y axis ($\omega_{1y}'$) at each time instant in which the value of said filtered linear acceleration along the x axis ($A_{1x}'$) is equal to said predetermined value,
        send to said processing unit (3):
        the time instants in which the value of said filtered linear acceleration along the x axis ($A_{1x}'$) is equal to said predetermined value,
        the value of said filtered angular velocity around the y axis ($\omega_{1y}'$) at said time instants,
    said second electronic device (2) is configured at least to send data to said processing data (3) and comprises inside:
    a second inertial measurement unit (22) comprising a second gyroscope (221) and a second accelerometer (222) and configured to:
        acquire, through said second gyroscope (221), the value of at least the angular velocity around the y axis ($\omega_{2y}$), and, through said second accelerometer (222), the value of at least the linear acceleration along the x axis ($A_{2x}$),
    second storage means (25) for storing data,
    a second logic control unit (21), connected to said second inertial measurement unit (22) and to said second storage means (25), and configured to:
        receive from the second inertial measurement unit (22) of said second electronic device (2), the value of said at least one angular velocity around the y axis ($\omega_{2y}$) and the value of said at least one linear acceleration along the x axis ($A_{2x}$),
        filter by means of a second digital the value of said at least one angular velocity around the y axis ($\omega_{2y}$) to obtain at least one filtered angular velocity around the y axis ($\omega_{2y}'$) and the value of said at least one linear acceleration along the x axis ($A_{2x}$) to obtain at least one filtered linear acceleration along the x axis ($A_{2x}'$),
        identify each further time instant in which the value of said filtered linear acceleration along the x axis ($A_{2x}'$) is equal to said predetermined value,
        storing in said second storing means (25):
        each further time instant in which the value of said filtered linear acceleration along the x axis ($A_{2x}'$) is equal to said predetermined value,
        the value of said filtered angular velocity around the y axis ($\omega_{2y}'$) at each further time instant in which the value of said filtered linear acceleration along the x axis ($A_{2x}'$) is equal to said predetermined value,
        send to said processing unit (3):
        the further time instants in which the value of said filtered linear acceleration along the x axis ($A_{2x}'$) is equal to said predetermined value,
        the value of said filtered angular velocity around the y axis ($\omega_{2y}'$) at said further time instants, said processing unit (3) is configured at least to receive data from said first electronic device (1) and from said second electronic device (2) and comprises inside:
  third storage means (35) in which the value of a reference angle $\alpha_{ref}$ is stored,
  a third logic control unit (31), connected to said third storing means (35), and configured to:
    receive the value of said filtered at least one angular velocity around the y axis ($\omega_{1y}'$) associated with the first electronic device (1) and each time instant in which the value of said at least one filtered linear acceleration along the x axis ($A_{1x}'$) associated with the first electronic device (1) is equal to said predetermined value,
    receive the value of said at least one filtered angular velocity around the y axis ($\omega_{2y}'$) associated with the second electronic device (2) and each further time instant in which the value of said at least one filtered linear acceleration along the x axis ($A_{2x}'$) associated with the second electronic device (2) is equal to said predetermined value,
    calculate an angle ($\alpha$) between a first axis (A1) and a second axis (A2), wherein said first axis (A1) is an axis passing through the centre of the tyre (10) and said first point and said second axis (A2) is an axis passing through the centre of the tyre (10) and said second point, according to the following formula:

$$\alpha = \frac{1}{N}\sum_{i=1}^{N} \overline{\omega}_i' \cdot |\Delta t_i|$$

wherein:
N is the number of time intervals $\Delta t_i$,
$\overline{\omega}_i'$ is the mean value of the filtered angular velocities around the y axis, defined by the value of the filtered angular velocity around the y axis ($\omega_{1y}'$) in an time instant of a respective time interval $\Delta t_i$, in which the respective filtered linear acceleration along the x axis ($A_{1x}'$) is equal to a predetermined value, and from the value of the filtered angular velocity around the y axis ($\omega_{2y}'$) in a further instant of time of said time interval $\Delta t_i$, in which the respective filtered linear acceleration along the x axis ($A_{2x}'$) is equal to said predetermined value,
$\Delta t_i$ is a respective time interval $\Delta t_1, \Delta t_2, \ldots \Delta t_N$ defined by a time instant $t_{1,1}, t_{1,2}, \ldots t_{1,N}$, in which the filtered linear acceleration along the x axis ($A_{1x}'$) is equal to a respective predetermined value and a further time instant $t_{2,1}, t_{2,2}, \ldots t_{2,N}$, in which the filtered linear acceleration long the x axis ($A_{2x}'$) is equal to said predetermined value, each time instant $t_{1,1}, t_{1,2}, \ldots t_{1,N}$ being outside a time interval $\Delta t_D$ in which a portion of said tyre (10) comes into contact with the ground and subsequently loses contact with the ground,
compare the value of the angle ($\alpha$) calculated with the value of the reference angle $\alpha_{ref}$ stored in said third storage means (35),
if the value of the angle ($\alpha$) is different from the value of the reference angle $\alpha_{ref}$, calculate the difference between the value of the angle ($\alpha$) and the value of the angle $\alpha_{ref}$ to measure the slip of the tyre (10) with respect to the rim (20).

2. System according to claim 1, characterized in that the third logic control unit (31) of said processing unit (3) is configured to generate an alarm signal when the calculated angle ($\alpha$) has a value falling outside a predetermined range of values centred on the value of said reference angle $\alpha_{ref}$, preferably for a predetermined number of consecutive times.

3. System according to any one of the previous claims claim 1, characterized in that the third logic control unit (31) is configured to:
  verify if the values of two or more calculated angles fall within said predetermined range of values,
  calculate the mean value of said two or more values of calculated angles,
  modify the value of said reference angle aref on the basis of said mean value, when said values fall within a predetermined range of values centred with respect to the last calculated angle value, preferably for a predetermined number of consecutive times.

4. System according to claim 1, characterized in that:
the first logic control unit (11) of said first electronic device (1) is configured to send to the processing unit (3) said time instants in which the value of said filtered linear acceleration along the x axis ($A_{1x}'$) is equal to said predetermined value and the value of said at least one filtered angular velocity around the y axis ($\omega_{1y}'$) at said time instants, when the tyre (10) has completed a predetermined first number of revolutions, and in that:
the second logic control unit (21) of said second electronic device (2) is configured to send to the processing unit (3) said further time instants in which the value of said filtered linear acceleration along the x axis ($A_{2x}'$) is equal to said predetermined value and the value of said at least one filtered angular velocity around the y axis ($\omega_{2y}'$) at said time instants when the tyre (10) has completed a predetermined second number of revolutions.

5. System according to claim 1, characterized in that:
said first digital filter is a first filter IIR; said first filter IIR having preferably a frequency between 0,1 Hz and 1 Hz,
and in that:
said second digital filter is a second filter IIR; said second filter IIR having preferably a frequency between 0,1 Hz and 1 Hz.

6. System according to claim 1, characterized in that:
said first electronic device (1) is configured to receive one or more signals from said processing unit (3) and is provided with a first clock source (16), connected to the first logic control unit (11),
said second electronic device (2) is configured to receive one or more signals from said processing unit (3) and is provided with a second clock source (26), connected to the second logic control unit (21), and
said processing unit (3) is configured to send one or more signals to each of said electronic devices (1,2) and is provided with a third clock source (36), said third clock source (36) being connected to said third control logic unit (31), and in that:
said third control logic unit (31) is configured to
send a synchronism signal to said first electronic device (1) and to said second electronic device (2) to synchronize said first clock source (16) and said second clock source (26) to the third clock source (36).

7. System according to claim 6, characterized in that the third logic control unit (31) of said processing unit (3) is configured to send said synchronism signal, when the tyre (10) has completed a predetermined number of revolutions.

8. System according to claim 1, characterized in that the third logic control unit (31) of said processing unit (3) is configured to:

store the respective reception time instant in which said third logic control unit (31) receives the value of the filtered angular velocity around the y axis ($\omega_{1y}'$) associated with the first electronic device (1) and the value of the filtered angular velocity around to the y axis ($\omega_{2y}'$) associated with the second electronic device (2), based on the time established by the third clock source (36), obtain:

the time instant in which the first electronic device (1) has stored the value of said further filtered angular velocity around the y axis ($\omega_{1y}'$), subtracting at the reception time instant a first time interval $\Delta_{1AT}$ referred to the time between the acquisition and the transmission of the value of said further filtered angular velocity around the y axis ($\omega_{1y}'$) to the processing unit (3) and a second time interval $\Delta t_{1V}$ due to the time required to said further filtered angular velocity around the y axis ($\omega_{1y}'$) to reach said processing unit (3), and the time instant in which the second electronic device (2) has stored the value of said further filtered angular velocity around the y axis ($\omega_{2y}'$), subtracting at the reception time instant a further first time interval $\Delta t_{2AT}$ referred to the time between the acquisition and the transmission of the value of said further filtered angular velocity around the y axis ($\omega_{2y}'$) to the processing unit (3) and a further second time interval $\Delta t_{2V}$ due to the time necessary for said further filtered angular velocity around the y axis ($\omega_{2y}'$) to reach said processing unit (3), calculate the time interval between said two time instants obtained.

9. Method for measuring the slip between a tyre (10) and a rim (20) on which said tyre (10) is mounted, by means of a system according to claim 1:

A) acquiring the value of at least one angular velocity around the y axis ($\omega_{1y}$) and the value of at least one linear acceleration along the x axis ($A_{1x}$), associated with said first electronic device (1), B) filtering by means of a first digital filter the value of said at least one angular velocity around the y axis ($\omega_{1y}$) to obtain at least one filtered angular velocity around the y axis ($\omega_{1y}'$) and the value of said at least one linear acceleration along the x axis ($A_{1x}$) to obtain at least one filtered angular acceleration along the x axis ($A_{1x}'$), C) identifying each time instant in which the value of said filtered linear acceleration along the x axis ($A_{1x}'$) is equal to a predetermined value, D) storing:

each time instant in which the value of said filtered linear acceleration along the x axis ($A_{1x}'$) is equal to said predetermined value, and the value of said filtered angular velocity around the y axis ($\omega_{1y}'$) at each time instant in which the value of said filtered linear acceleration along the x axis ($A_{1x}'$) is equal to said predetermined value, E) acquiring the value of said at least one angular velocity around the y axis ($\omega_{2y}$) and the value of said at least one linear acceleration along the x axis ($A_{2x}$), associated with said second electronic device (2), F) filtering by means of a second digital filter the value of said at least one angular velocity around the y axis ($\omega_{2y}$) to obtain at least one filtered angular velocity around the y axis ($\omega_{2y}'$) and the value of said at least one linear acceleration along the x axis ($A_{2x}$) to obtain at least one filtered linear acceleration along the x axis ($A_{2x}'$), G) identifying each further time instant in which the value of said filtered linear acceleration along the x axis ($A_{zx}'$) is equal to said predetermined value, H) storing:

each further time instant in which the value of said filtered linear acceleration along the x axis ($A_{2x}'$) is equal to said predetermined value, the value of said filtered angular velocity around the y axis ($\omega_{2y}'$) at each further time instant in which the value of said filtered linear acceleration along the x axis ($A_{2x}'$) is equal to said predetermined value, I) calculating an angle ($\alpha$) according to the following formula:

$$\alpha = \frac{1}{N}\sum_{i=1}^{N} \bar{\omega}_i' \cdot |\Delta t_i|$$

wherein:

N is the number of time intervals $\Delta t_i$, of is the mean value of the filtered angular velocities around the y axis, defined by the value of the filtered angular velocity around the y axis ($\omega_{1y}'$) in an time instant of a respective time interval $\Delta t_i$, in which the respective filtered linear acceleration along the x axis ($A_{1x}'$) is equal to a predetermined value, and from the value of the filtered angular velocity around the y axis ($\omega_{2y}'$) in a further instant of time of said time interval $\Delta t_i$, in which the respective filtered linear acceleration along the x axis ($A_{2x}'$) is equal to said predetermined value, $\Delta t_i$ is a respective time interval $\Delta t_1, \Delta t_2, \ldots \Delta t_N$ defined by a time instant $t_{1,1}, t_{1,2}, \ldots t_{1,N}$, in which the filtered linear acceleration along the x axis ($A_{1x}'$) associated with the first electronic device (1) is equal to a respective predetermined value and a further time instant $t_{2,1}, t_{2,2}, \ldots t_{2,N}$, in which the filtered linear acceleration along the x axis ($A_{2x}'$) associated to the second electronic device (2) is equal to said predetermined value, each time instant $t_{1,1}, t_{1,2}, \ldots t_{1,N}$ being outside a time interval $\Delta t_D$ in which a portion of said tyre (10) comes into contact with the ground and subsequently loses contact with the ground, J) comparing the value of the angle ($\alpha$) calculated with the value of a reference angle $\alpha_{ref}$, K) if the value of the angle ($\alpha$) is different from the value of the reference angle $\alpha_{ref}$, calculating the difference between the value of the angle ($\alpha$) and the value of the angle $\alpha_{ref}$ to measure the slip of the tyre (10) with respect to the rim (20).

10. System according to claim 2, characterized in that the third logic control unit (31) is configured to:

verify if the values of two or more calculated angles fall within said predetermined range of values, calculate the mean value of said two or more values of calculated angles, modify the value of said reference angle dref on the basis of said mean value, when said values fall within a predetermined range of values centred with respect to the last calculated angle value, preferably for a predetermined number of consecutive times.

11. System according to claim 2, characterized in that:
the first logic control unit (11) of said first electronic device (1) is configured to send to the processing unit (3) said time instants in which the value of said filtered linear acceleration along the x axis ($A_{1x}'$) is equal to said predetermined value and the value of said at least one filtered angular velocity around the y axis ($\omega_{1y}'$) at said time instants, when the tyre (10) has completed a predetermined first number of revolutions, and in that:
the second logic control unit (21) of said second electronic device (2) is configured to send to the processing unit (3) said further time instants in which the value of said filtered linear acceleration along the x axis ($A_{2x}'$) is equal to said predetermined value and the value of said at least one filtered angular velocity around the y axis ($\omega_{2y}'$) at said time instants when the tyre (10) has completed a predetermined second number of revolutions.

12. System according to claim 3, characterized in that:
the first logic control unit (11) of said first electronic device (1) is configured to send to the processing unit (3) said time instants in which the value of said filtered linear acceleration along the x axis ($A_{1x}'$) is equal to said predetermined value and the value of said at least one filtered angular velocity around the y axis ($\omega_{1y}'$) at said time instants, when the tyre (10) has completed a predetermined first number of revolutions, and in that:
the second logic control unit (21) of said second electronic device (2) is configured to send to the processing unit (3) said further time instants in which the value of said filtered linear acceleration along the x axis ($A_{2x}'$) is equal to said predetermined value and the value of said at least one filtered angular velocity around the y axis ($\omega_{2y}'$) at said time instants when the tyre (10) has completed a predetermined second number of revolutions.

13. System according to claim 2, characterized in that:
said first digital filter is a first filter IIR; said first filter IIR having preferably a frequency between 0,1 Hz and 1 Hz,
and in that:
said second digital filter is a second filter IIR; said second filter IIR having preferably a frequency between 0,1 Hz and 1 Hz.

14. System according to claim 3, characterized in that:
said first digital filter is a first filter IIR; said first filter IIR having preferably a frequency between 0,1 Hz and 1 Hz,
and in that:
said second digital filter is a second filter IIR; said second filter IIR having preferably a frequency between 0,1 Hz and 1 Hz.

15. System according to claim 4, characterized in that:
said first digital filter is a first filter IIR; said first filter IIR having preferably a frequency between 0,1 Hz and 1 Hz, and in that:
-said second digital filter is a second filter IIR; said second filter IIR having preferably a frequency between 0,1 Hz and 1 Hz.

16. System according to claim 2, characterized in that:
said first electronic device (1) is configured to receive one or more signals from said processing unit (3) and is provided with a first clock source (16), connected to the first logic control unit (11),
said second electronic device (2) is configured to receive one or more signals from said processing unit (3) and is provided with a second clock source (26), connected to the second logic control unit (21), and
said processing unit (3) is configured to send one or more signals to each of said electronic devices (1,2) and is provided with a third clock source (36), said third clock source (36) being connected to said third control logic unit (31),
and in that:
said third control logic unit (31) is configured to send a synchronism signal to said first electronic device (1) and to said second electronic device (2) to synchronize said first clock source (16) and said second clock source (26) to the third clock source (36).

17. System according to claim 3, characterized in that:
said first electronic device (1) is configured to receive one or more signals from said processing unit (3) and is provided with a first clock source (16), connected to the first logic control unit (11),
said second electronic device (2) is configured to receive one or more signals from said processing unit (3) and is provided with a second clock source (26), connected to the second logic control unit (21), and
said processing unit (3) is configured to send one or more signals to each of said electronic devices (1,2) and is provided with a third clock source (36), said third clock source (36) being connected to said third control logic unit (31),
and in that:
said third control logic unit (31) is configured to send a synchronism signal to said first electronic device (1) and to said second electronic device (2) to synchronize said first clock source (16) and said second clock source (26) to the third clock source (36).

18. System according to claim 4, characterized in that:
said first electronic device (1) is configured to receive one or more signals from said processing unit (3) and is provided with a first clock source (16), connected to the first logic control unit (11),
said second electronic device (2) is configured to receive one or more signals from said processing unit (3) and is provided with a second clock source (26), connected to the second logic control unit (21), and
said processing unit (3) is configured to send one or more signals to each of said electronic devices (1,2) and is provided with a third clock source (36), said third clock source (36) being connected to said third control logic unit (31),
and in that:
said third control logic unit (31) is configured to send a synchronism signal to said first electronic device (1) and to said second electronic device (2) to synchronize said first clock source (16) and said second clock source (26) to the third clock source (36).

19. System according to claim 5, characterized in that:
said first electronic device (1) is configured to receive one or more signals from said processing unit (3) and is provided with a first clock source (16), connected to the first logic control unit (11),
said second electronic device (2) is configured to receive one or more signals from said processing unit (3) and is provided with a second clock source (26), connected to the second logic control unit (21), and
said processing unit (3) is configured to send one or more signals to each of said electronic devices (1,2) and is provided with a third clock source (36), said third clock source (36) being connected to said third control logic unit (31), and in that:

said third control logic unit (31) is configured to
send a synchronism signal to said first electronic device (1) and to said second electronic device (2) to synchronize said first clock source (16) and said second clock source (26) to the third clock source (36).

20. System according to claim 2, characterized in that the third logic control unit (31) of said processing unit (3) is configured to:
store the respective reception time instant in which said third logic control unit (31) receives the value of the filtered angular velocity around the y axis ($\omega_{1y}'$) associated with the first electronic device (1) and the value of the filtered angular velocity around to the y axis ($\omega_{2y}'$) associated with the second electronic device (2), based on the time established by the third clock source (36), obtain:
the time instant in which the first electronic device (1) has stored the value of said further filtered angular velocity around the y axis ($\omega_{1y}'$), subtracting at the reception time instant a first time interval $\Delta t_{1AT}$ referred to the time between the acquisition and the transmission of the value of said further filtered angular velocity around the y axis ($\omega_{1y}'$) to the processing unit (3) and a second time interval $\Delta t_{1y}$ due to the time required to said further filtered angular velocity around the y axis ($\omega_{1y}'$) to reach said processing unit (3), and the time instant in which the second electronic device (2) has stored the value of said further filtered angular velocity around the y axis ($\omega_{2y}'$), subtracting at the reception time instant a further first time interval $\Delta t_{2AT}$ referred to the time between the acquisition and the transmission of the value of said further filtered angular velocity around the y axis ($\omega_{2y}'$) to the processing unit (3) and a further second time interval $\Delta t_{2y}$ due to the time necessary for said further filtered angular velocity around the y axis ($\omega_{2y}'$) to reach said processing unit (3), calculate the time interval between said two time instants obtained.

* * * * *